United States Patent
Williams et al.

(10) Patent No.: US 11,981,423 B2
(45) Date of Patent: May 14, 2024

(54) AIRCRAFT LANDING GEAR ASSEMBLY

(71) Applicant: SAFRAN LANDING SYSTEMS UK LTD, Gloucester (GB)

(72) Inventors: Lee Williams, Gloucester (GB); Doug Wight, Gloucester (GB); Peter Millington, Gloucester (GB); Steven Lawson, Gloucester (GB)

(73) Assignee: Safran Landing Systems UK Ltd (GB)

( * ) Notice: Subject to any disclaimer, the term of this patent is extended or adjusted under 35 U.S.C. 154(b) by 92 days.

(21) Appl. No.: 17/799,748

(22) PCT Filed: Feb. 15, 2021

(86) PCT No.: PCT/IB2021/020005
§ 371 (c)(1),
(2) Date: Aug. 15, 2022

(87) PCT Pub. No.: WO2021/165750
PCT Pub. Date: Aug. 26, 2021

(65) Prior Publication Data
US 2023/0071768 A1 Mar. 9, 2023

(30) Foreign Application Priority Data
Feb. 19, 2020 (EP) .................................... 20158193

(51) Int. Cl.
*B64C 25/00* (2006.01)
(52) U.S. Cl.
CPC ...... *B64C 25/001* (2013.01); *B64C 2025/003* (2013.01)
(58) Field of Classification Search
CPC .. B64C 25/001; B64C 2025/003; F16L 15/11; F16L 55/12; F16L 55/132
See application file for complete search history.

(56) References Cited

U.S. PATENT DOCUMENTS 6,382,011 B1 * 5/2002 Mayer .................. G01F 25/10
73/1.06
6,453,603 B1 * 9/2002 Baker .................. A01M 1/2011
43/132.1

(Continued)

FOREIGN PATENT DOCUMENTS

| CA | 2735083 A1 * | 9/2011 | ............. B25B 13/48 |
| EP | 2282066 A1 | 2/2011 | |
| JP | 2019007583 A | 1/2019 | |

OTHER PUBLICATIONS

Extended European Search Report for European Application No. 20158193.1, dated Aug. 21, 2020, 10 pages.

(Continued)

*Primary Examiner* — Assres H Woldemaryam
(74) *Attorney, Agent, or Firm* — Buchanan Ingersoll & Rooney PC

(57) ABSTRACT

An aircraft landing gear assembly comprising: a structural pin defining a first bore having a longitudinal insertion axis; a cap for covering the bore, the cap comprising: a base portion; a head portion; a body portion positioned between the base portion and the head portion; and a bolt which extends between the head portion and the base portion and comprises a threaded portion so that engagement of either the head portion or the base portion with the threaded portion moves either the head portion or the base portion relative to the other, the body being formed of an elastically deformable material such that upon tightening of the bolt, the base portion moves towards the head portion and the elastically deformable material moves radially outwards such that a contact surface of the elastically deformable material engages with an inner surface of the first bore in order to retain the cap.

18 Claims, 6 Drawing Sheets

(56) References Cited

U.S. PATENT DOCUMENTS

| | | | |
|---|---|---|---|
| 6,662,490 B1* | 12/2003 | Aesch, Jr. | F16L 55/132 |
| | | | 43/132.1 |
| 8,573,354 B1 | 11/2013 | Cottet et al. | |
| 8,640,823 B2* | 2/2014 | Masson | B64C 25/36 |
| | | | 244/1 N |
| 8,820,363 B2* | 9/2014 | Polivka | B25B 21/004 |
| | | | 138/92 |
| 10,406,875 B1* | 9/2019 | Porath | B60D 1/605 |
| 2005/0116097 A1 | 6/2005 | Reniau | |
| 2011/0232793 A1 | 9/2011 | Polivka et al. | |
| 2016/0018042 A1* | 1/2016 | Bair | F16L 55/1141 |
| | | | 138/89 |
| 2019/0376546 A1 | 12/2019 | Pizana | |

OTHER PUBLICATIONS

International Search Report and Written Opinion for International Application No. PCT/IB2021/020005, dated May 27, 2021, 14 pages.

European Communication pursuant to Article 94(3) for European Application No. 20158193.1, dated Feb. 10, 2023, 4 pages.

\* cited by examiner

AIRCRAFT LANDING GEAR ASSEMBLY

This application is a U.S. National Phase application of PCT International Application No. PCT/IB2021/020005, filed Feb. 15, 2021, which claims the benefit of EP 20158193.1, filed Feb. 19, 2020, both of which are incorporated by reference herein.

BACKGROUND OF THE INVENTION

Known aircraft landing gear assemblies are arranged to retract and occupy a small storage area when stowed. This arrangement can require many structural pins, such as pivot pins, to connect components which move relative to each other when the landing gear is retracted and deployed. Since aircraft landing gear assembles are preferably lightweight, these structural pins are often hollow.

In use, the hollow pins can cause air column resonances which result in aerodynamic or "aero-acoustic" noise, which can significantly contribute to overall excess aircraft noise. To address this, an open end of a pin can be covered by a cap, an example of which is described in U.S. Pat. No. 8,640,823B2.

The present inventors have identified that current aircraft landing gear pin caps can be incompatible with the design of some pins, can be difficult to fit, and can be difficult or impossible to refit once removed. Therefore, the present inventors have identified a need for a noise-reducing cap which addresses one or more of these problems.

SUMMARY OF THE INVENTION

According to a first aspect of the invention there is an aircraft landing gear assembly comprising:
- a structural pin defining a first bore having a longitudinal insertion axis;
- a cap for covering the first bore, the cap comprising:
  - a base portion;
  - a head portion;
  - a body portion positioned between the base portion and the head portion; and
- a bolt which extends between the head portion and the base portion and comprises a threaded portion so that engagement of either the head portion or the base portion with the threaded portion moves either the head portion or the base portion relative to the other,
- the body being formed of an elastically deformable material such that upon tightening of the bolt, the base portion moves towards the head portion and the elastically deformable material moves radially outwards such that a contact surface of the elastically deformable material engages with an inner surface of the first bore in order to retain the cap.

This arrangement can provide a self-contained cap which covers an open end of a structural pin to reduce aerospace noise produced by aircraft landing gear assemblies. As the body portion is formed from an elastically deformable material, the body portion can have a relatively small insertion footprint when the base portion and head portion are allowed to move apart. This results in a cap which is reusable, self-contained, and can be easily removed and reattached by a maintenance engineer.

Furthermore, as the cap is secured by the contact surface engaging with the inner surface of the structural pin, the arrangement of the pin past the opening cannot impact the fit of the cap. For example, if the structural pin comprises a central retaining pin or thin sidewalls.

The base portion and/or head portion can be formed of a composite material.

This arrangement can provide a lightweight cap.

The contact face can be non-metallic.

This arrangement can be particularly advantageous as it increases the lifetime of the structural pin by providing a cap which can reduce the likelihood of abrasion in comparison to known cap assemblies. Moreover, it can enable the use of a non-coated structural pin. This is advantageous as it can be difficult to apply coatings to the inner surface of cylindrical shapes and they can comprise chemical compositions which are harmful to the environment.

The head portion can comprise a non-threaded separation member located closer to the bolt than the open surface of the head portion to provide a shoulder portion so that the bolt cannot be over tightened.

This arrangement can result in a cap which is difficult to over tighten as the shoulder portion provides a stepped region which can enable a maintenance engineer to control the proximity of the head portion to the body portion, which can inhibit over-tightening. This therefore results in an arrangement in which the degree of radial movement by the elastically deforming material can be controlled. This is particularly advantageous for landing gear assemblies which can experience large temperature fluctuations, and associated thermal expansions/contractions, when being used and being stowed. Moreover, this arrangement can prevent accidental damage to the inner surface of the structural pin due to over tightening.

The head portion can have a first diameter which is larger than the first bore diameter.

This can result in an arrangement which is simple to assemble as the cap can be consistently fitted to the structural pin each time it is removed and refitted.

The elastically deformable material can comprise a second bore defining an inner surface of the elastically deformable material such that the bolt is located within the second bore.

The elastically deformable material can further comprise a chamfer which can extend from the inner surface of the second bore to an axial face of the elastically deformable material located closer to the head portion than the base portion.

This can result in an arrangement in which the deformation of the elastically deformable material is controlled to ensure that it moves radially outward in a particular region.

The chamfer can have an angle of between 30 and 60 degrees with respect to the longitudinal insertion axis. The angle can be 45 degrees.

This can optimise the movement of the elastically deformable material to enable an efficient fit.

The bolt can be connected to the head portion, closer to the centre of the head portion than the circumference of the head portion so that the bolt is coaxially aligned with the first bore.

This arrangement can result in the bolt being aligned centrally in the structural pin.

Therefore, an equal load will be applied to the elastically deformable material so that the elastically deformable material can move uniformly to form a consistent fit around the inner circumference of the structural pin.

The contact surface can be softer than the inner surface of the first bore.

The contact surface can be parallel to the inner surface of the bore.

This arrangement can provide a high friction interference fit whilst reducing the overall force directed towards the inner surface of the structural pin which can therefore reduce the likelihood of damage to the inner surface.

The base portion can have a frustoconical shape with a smaller diameter face of the frustoconical shape being closer to the head portion in comparison with a larger diameter face of the frustoconical shape.

The body portion can comprise a plurality of members, parallel to the body portion and arranged to elastically deform when the base portion is moved towards the head portion, each member connected by the contact surface, wherein the contact surface has one or more protrusions which each extend around the contact surface to connect the members.

This can result in an arrangement with controlled localised high pressure points at the protrusions. As the protrusions can be formed of an elastically deformable material, they can provide high pressure areas to grip the inner surface of the bore whilst also deforming if the pressure is too high to reduce the likelihood of damaging the bore inner surface.

The outer surface of the body portion which is hidden within the bore can have a first colour and the outer surface of the body portion which is visible can have a second colour and wherein the first colour can be distinct from the second colour.

This arrangement can enable a maintenance engineer to quickly determine whether the cap us becoming lose or is not correctly inserted.

The structural pin can be located in the stay arrangement, the lock link, the torque link and/or the main bogie beam pivot.

BRIEF DESCRIPTION OF THE DRAWINGS

Embodiments of the invention will now be described, by way of non-limiting examples only, with reference to the following accompanying figures, in which:

FIGS. 3 3A and 3B show a cap of the landing gear assembly;

FIGS. 5 5A, 5B, and 5C show a cap of an alternative embodiment; and

DETAILED DESCRIPTION

Figure 1:
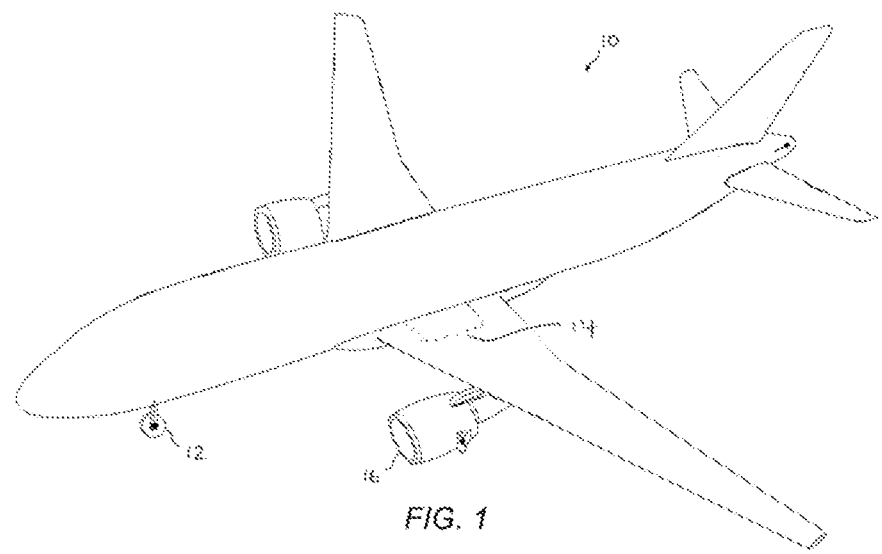
FIG. 1 is a schematic diagram of an aircraft.

FIG. 1 is a diagram of an aircraft 10. The aircraft 10 includes subassemblies such as a nose landing gear 12, main landing gear 14 and engines 16. Other aircraft subassemblies will be apparent to the skilled person. A subassembly can be a group of interconnected parts which are arranged to be fitted to the aircraft as a unit.

Figure 2:
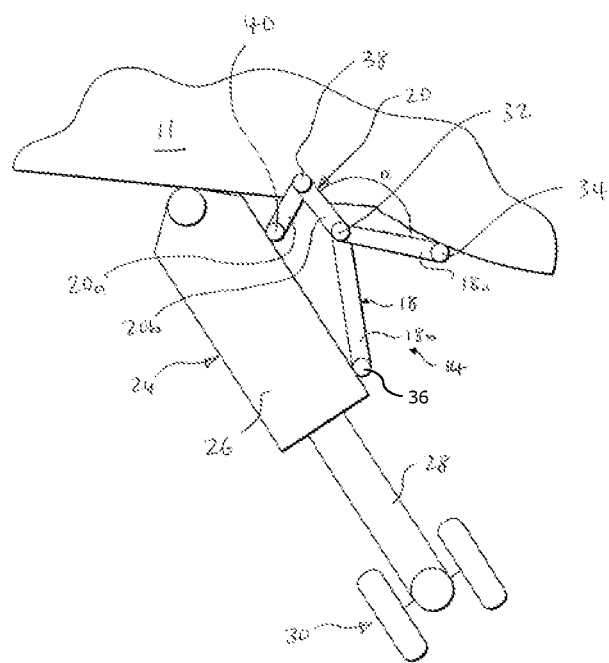
FIG. 2 is a schematic diagram of an aircraft landing gear assembly according to an embodiment of the invention.

Referring now to FIG. 2, an aircraft subassembly, namely an aircraft landing gear assembly, is shown generally at 14. The landing gear assembly 14 includes a foldable stay 18 and a lock link 20 and a down lock spring assembly (not shown) mounted to the stay 18 and arranged to urge the lock link 20 to assume a locked state. In addition, the landing gear assembly also includes a shock absorber 24, comprising a main fitting 26 and a sliding tube 28, as well as a wheels and brake assembly 30.

The aircraft landing gear assembly is movable between a deployed condition, for take-off and landing, and a stowed condition for flight.

The stay 18 has an elongate upper stay arm 18a having a lower end defining a pair of lugs pivotally coupled via a pivot pin 32 to a pair of lugs defined at an upper end of an elongate lower stay arm 18b. The stay arms 18a and 18b may therefore pivotally move relative to one another about the pivot pin 32. The upper end of the upper stay arm 18a defines a pair of lugs that are pivotally coupled to a lug of a connector 34 which in turn is pivotally coupled to the airframe 11. The lower end of the lower stay arm 18b defines a pair of lugs that are pivotally coupled to a lug of a connector 36 which in turn is pivotally coupled to the main strut 26.

The lock link 20 has an elongate upper link arm 20a having a lower end pivotally coupled to an upper end of an elongate lower link arm 20b via a pivot pin 38. The link arms 20a, b may therefore pivotally move relative to one another about the pivot pin 38. An upper end of the upper link arm 20a defines a pair of lugs that are pivotally coupled to a lug of a connector 40 which in turn is pivotally coupled to the main strut 26. A lower end of the lower link arm 20b defines a lug that is pivotally coupled to lugs of the stay arms 18a, b via the pivot pin 32. Lugs of the upper stay arm 18a are disposed between the lugs of the lower stay arm 18b and the lugs of the lower link arm 20b.

Figure 3:
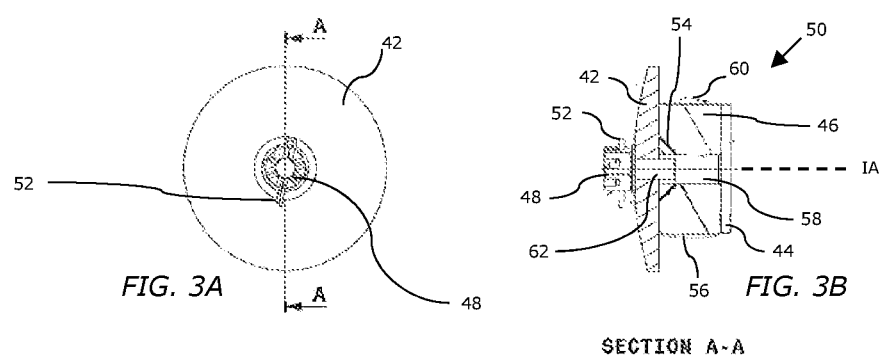

With reference to FIGS. 3A and 3B, an a cover for covering an open end of structural pins such as the pivot pins 32, 38 and connectors 36, 40 of FIG. 2 is shown generally at 50. For brevity such pins and connectors will be referred to as a structural pin. Various aircraft assemblies include structural pins.

In the illustrated embodiment the cover 50 is in the form of an adjustable plug 50. The plug 50 has a base portion 44, a head portion 42, and a body portion 46 which is located between the base portion 44 and head portion 42, along the insertion axis IA. The base portion 44 and/or head portion 42 are formed of a composite material, such as nylon or polyoxymethylene. The body portion 46 is formed of an elastically deformable material, such as an ethylene propylene compound and defines an inner bore 62.

The plug 50 is arranged with a bolt 58 extending at least partially through the body portion 46, parallel to an insertion axis IA along which the plug 50 is arranged to be inserted into the bore of a structural pin (not shown). The head 48 of the bolt 58 is located closer to the head portion 42 than the base portion 44 and the bolt is secured by a nut 48 located at the head of the bolt 58.

The plug 50 is arranged to be inserted at least partially into a bore of a structural pin. The plug 50 is sized so that, prior to insertion, the base portion 44 and body portion 46 have a smaller diameter than the inner diameter of the structural pin to which they are arranged to be inserted and the head portion 42 has a larger diameter than the inner diameter of the structural pin. The base portion 44 and body portion 46 can be arranged so that their outer surfaces are flush when the plug 50 is not in use.

When inserted into an open end of a structural pin, the base portion 44 and body portion 46 are within the diameter of the structural pin. The nut 48 is tightened by winding the nut 48 along a threaded portion (not shown) of the bolt 58. The tightening of the nut 48 causes the base portion 44 to move towards the head portion 42, along the insertion axis IA. As the body portion 46 connects the base portion 44 and head portion 42, the relative movement of the base portion 44 and head portion 42 will produce a force on the body portion 46. The body portion 46 is formed of an elastically deformable material meaning that force on the body portion 46 causes the elastically deformable material to change shape and the original shape can be recovered when the force is removed. In other words, when the nut 48 is tightened, the base portion 44 is pulled towards the head portion 42, causing the body portion 46 to elastically deform.

In some embodiments, the bolt has an arrangement which inhibits overtightening of the nut 48. This can for example be achieved by arranging the bolt with a non-threaded portion or a shoulder so that the nut 48 cannot travel the full length of the bolt. By providing an arrangement which inhibits overtightening of the nut 88, the likelihood of damage to the structural pin from the plug can be reduced.

The body portion 46 is arranged to elastically deform such that an outer surface 60 of the body portion 46 moves radially outwardly to contact the inner surface of the structural pin thus defining a contact surface. This arrangement provides a friction force between the outer body portion surface 60 and structural pin inner surface to secure the plug 50 within the structural pin without an external component. The nut 48 is doubled locked to maintain the bolt 58 position and therefore maintain the overall plug 50 position within the structural pin. An example of double locking is achieved via a nut with a self-locking insert and a split pin.

The contact surface 60 of the body portion 46 can be formed of a non-metallic material, such as rubber, which is softer than the inner surface of the structural pin. This can reduce the likelihood of the plug damaging the inner surface of the structural pin.

In some embodiments, the bolt 58 can be aligned with the insertion axis so that the bolt 58 is located in the centre of the body portion 46. Alternatively, the bolt 58 can be split to define a plurality of branched bolts which connect multiple points on the base portion 44 with the head portion 42.

To aid the deformation of the body portion 46 radially outward, the illustrated embodiment includes a chamfer arranged in the body portion 46. The chamfer is located between the sidewall of the body portion inner bore 62 and the axial face of the body portion 46 which is closer to the head portion 42 than the base portion 44. This arrangement biases the body portion 46 such that when a force is applied to the elastically deformable material due to the relative movement of the head portion 42 and base portion 44, the elastically deformable material will move radially outward. The shape and size of the chamfer can be dependent on the material which forms the body portion. For example, a body portion formed of nylon or polyoxymethylene and can have a chamfer angle of 45 degrees with respect to the inner bore 62.

Figure 4:
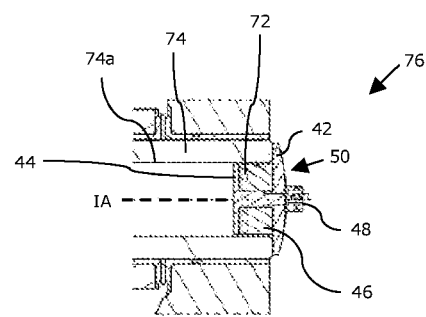
FIG. 4 is a schematic diagram of the cap of FIGS. 3A and 3B in use.

With reference to FIG. 4, an example arrangement of the plug 50 in use is shown generally at 76. In this arrangement, the plug 50 has been inserted into the structural pin 74. The nut 48 has been tightened causing the base portion 44 to move towards the head portion 42 so that the base portion is in a locked position 72. This forces the body portion 46 radially outward so that the elastically deformable outer surface 60 is in contact with the inner surface 74*a* of the structural pin 74.

The plug 50 can be removed from the structural pin 74 without causing damage to itself. As the body portion 46 is formed of an elastically deformable material, the plug 50 is arranged to return to its original size and shape once the compressive bias load is removed, enabling the plug 50 to be easily removed from the structural pin 74. Removal or loosening of the double locked nut 48 removes the force between the base portion 44 and body portion 46 which allows the elastically deformable material to return to a shape which is more closely aligned with its original shape of the body portion 46 diameter being smaller than the structural pin 74 internal diameter. This allows the plug 50 to be reusable which in turn allows a maintenance engineer to remove and refit the plug 50 if engineering work is carried out on the structural pin 74.

Figure 5:
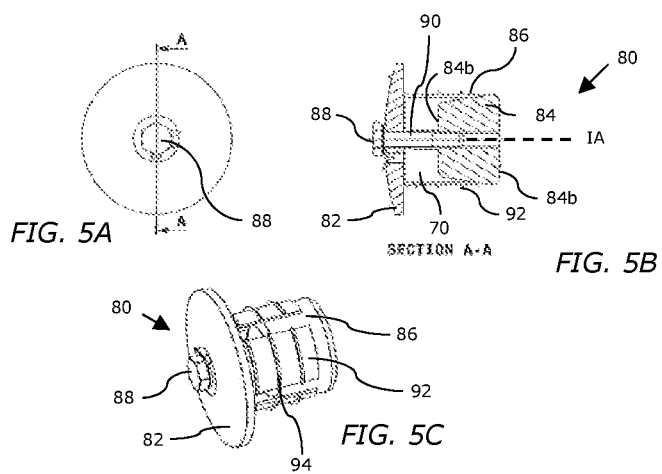

With reference to FIGS. 5A, 5B, and 5C, a plug 80 according to a further embodiment is shown. Similarly to the previous embodiment, the plug 80 is formed of a head portion 82, a base portion 84, and a body portion 86. The body portion 86 is located between the head portion 82 and base portion 84 and forms an inner bore 70 parallel to the insertion axis IA. The inner bore 70 has a substantially uniform diameter when the plug 80 is not in use. The base portion 84 and body portion 86 have a smaller diameter than the inner dimeter of the structural pin in which it is to be inserted. The head portion 82 has a larger diameter than the inner diameter of the structural pin. The base portion 84 is frustoconical in shape with a first end face 84*a* and a second end face 84*b* wherein the first end face 84*a* has a smaller diameter than the second end face 84*b*. The base portion 84 is cylindrically aligned with the insertion axis IA so that the smaller diameter end face 84*a* is closer to the head portion 82 than the second end face 84*b*. The body portion 86 is formed of an elastically deformable material, such as nylon or polyoxymethylene. The head portion 82 and base portion 84 are formed of a composite material, such as nylon or polyoxymethylene.

The base portion 86 can have any suitable shape. For example, in other embodiments, the base portion 86 has a hyperbolic cone shape with the point of the cone closer to the head portion 82 with respect to the insertion axis IA.

The body portion second end face 84*b* has a larger diameter than the uniform inner bore diameter and thus when the plug 80 is not in use, the second face end 84*b* is located outside of the body portion inner bore 70.

The body portion 86 has an overall cylindrical structure but is not a continuous structure. Sections 94 of the outer surface of the body portion 86 are cut away to aid the deformation of the body portion 86. The outer surface of the body portion 86 has at least one ridged portion 92 which is located radially on the outer surface of the body portion 86 and centrally aligned with the insertion axis IA.

A bolt 90 connects the head portion 82 and base portion 84, with a nut 88 located at the head of the bolt 90. As the nut 88 is tightened, the base portion 84 moves towards the head portion 82 and thus further into the inner bore 70 of the body portion 86. As the base portion 84 is a rigid structure, it applies a force to the inner surface of the body portion 86 as the nut 88 is tightened. The force applied to the inner surface causes the elastically deformable material of the body portion 86 to deform radially outwards so that the ridged portion 92 of the body portion contacts the inner surface of the structural pin.

Figure 6:
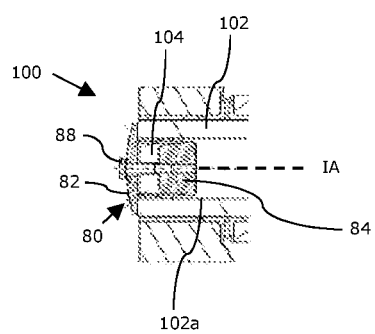
FIG. 6 shows a schematic diagram of the cap of FIGS. 5A, 5B, and 5C in use.

With reference to FIG. 6, an example arrangement of the plug 80 in use is shown generally at 100. The plug 80 is inserted into the pin 102, along the insertion axis IA. As the nut 88 is tightened, the base portion 84 moves towards the locked position shown at 104. This forces the elastically deformable material 86 radially outwards so that the ridged portion 92 contacts the inner surface 102*a* of the structural pin 102. The contact between the ridged portion 92 and the structural pin 102 inner wall 102*a* secures the plug 80 in the open end of the structural pin 102.

The plug 80 can be removed without causing damage to itself. As the body portion 86 is formed of an elastically deformable material, the plug 80 will return to its original size and shape once it is removed from the structural pin 102. Removal or loosening of the double locked nut 88 removes the force between the base portion 84 and body portion 86 which allows the elastically deformable material to return to a shape which is more closely aligned with its original shape and structure. Specifically, the force on the base portion 84 which pulls the base portion 86 towards the head portion 82 is removed and the base portion 84 is able to move away from the head portion 82, along the insertion axis IA. As a result, the frustoconical shape of the base portion 84 will result in the body portion 86 being elastically restored to a diameter which is smaller than the inner diameter of the structural pin 102. This allows the plug 80 to be reusable which in turn allows a maintenance engineer to remove and refit the plug 80 if engineering work is carried out on the structural pin 102.

In any embodiment, the plug can have distinct patterns or colouration to help distinguish whether the plug is correctly inserted into the structural pin. In one example, the body portion has a first colour and the head portion has a second colour, which is distinct from the first colour. With a distinct body portion, maintenance engineers can quickly and easily identify whether the plug is correctly inserted as if the first colour is visible, it can be determined that the plug needs to be moved further into the open end of the structural pin. This additionally enables the diameter of the head portion to be equal to or smaller than the inner diameter of the structural pin as it provides a marking on the pin so that it can be determined how far the plug should be inserted into the open end of the pin.

The structural pin can be any hollow pivot pin in the landing gear assembly, such as the main bogie pivot or torque link pivot, or a structural pin of another aircraft assembly.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" can mean "including" or "consisting of" and therefore does not exclude the presence of elements or steps other than those listed in any claim or the specification as a whole. The word "coupled" can mean "attached" or "connected". The singular reference of an element does not exclude the plural reference of such elements and vice-versa. In an apparatus claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear assembly comprising:
   a strut arranged to be coupled to an aircraft;
   a ground contacting assembly coupled to the strut for, in use, supporting a weight of the aircraft on the ground;
   a structural pin defining a first bore having a longitudinal insertion axis;
   a cap for covering the first bore, the cap comprising:
   (i) a base portion;
   (ii) a head portion;
   (iii) a body portion positioned between the base portion and the head portion; and
   (iv) a bolt which extends between the head portion and the base portion and comprises a threaded portion so that engagement of either the head portion or the base portion with the threaded portion moves either the head portion or the base portion relative to the other,
   the body portion being formed of an elastically deformable material such that upon tightening of the bolt, the base portion moves towards the head portion and the elastically deformable material moves radially outwards such that a contact surface of the elastically deformable material engages with an inner surface of the first bore in order to retain the cap.

2. The aircraft landing gear assembly according to claim 1, wherein the base portion and/or the head portion is formed of a composite material.

3. The aircraft landing gear assembly according to claim 1, wherein the contact surface is non-metallic.

4. The aircraft landing gear assembly according to claim 1, wherein the head portion comprises a non-threaded member located closer to the bolt than the open surface of the head portion to provide a shoulder portion.

5. The aircraft landing gear assembly according to claim 1, wherein the head portion has a first diameter which is larger than a first bore diameter.

6. The aircraft landing gear assembly according to claim 1, wherein the elastically deformable material comprises a second bore defining an inner surface of the elastically deformable material such that the bolt is located within the second bore.

7. The aircraft landing gear assembly according to claim 6, wherein the elastically deformable material further comprises a chamfer which extends from the inner surface of the second bore to an axial face of the elastically deformable material located closer to the head portion than the base portion.

8. The aircraft landing gear assembly according to claim 7, wherein the chamfer has an angle of between 30 and 60 degrees with respect to the longitudinal insertion axis.

9. The aircraft landing gear assembly according to claim 1, wherein the bolt is connected to the head portion closer to the centre of the head portion than the circumference of the head portion so that the bolt is coaxially aligned with the first bore.

10. The aircraft landing gear assembly according to claim 1, wherein the contact surface is softer than the inner surface of the first bore.

11. The aircraft landing gear assembly according to claim 1, wherein the contact surface is parallel to the inner surface of the first bore.

12. An aircraft landing gear assembly according to claim 6, wherein the base portion has a frustoconical shape with a smaller diameter face of the frustoconical shape closer to the head portion.

13. The aircraft landing gear assembly according to claim 12, wherein the body portion comprises a plurality of members, parallel to the insertion axis and arranged to elastically deform when the base portion is moved towards the head portion, wherein the contact surface is defined by one or more protrusions which each extend around the body portion.

14. The aircraft landing gear assembly according to claim 1, wherein the outer surface of the body portion which is hidden within the first bore has a first color and the outer surface of the head portion which is visible has a second color and wherein the first color is distinct from the second color.

15. The aircraft landing gear assembly according to claim 1, wherein the structural pin is located in a stay arrangement, a lock link, a torque link and/or a main bogie beam pivot.

16. The aircraft landing gear assembly according to claim 1, wherein the head portion comprises a nut arranged to be wound along the threaded portion to cause the elastically deformable material to move radially outwards.

17. The aircraft landing gear assembly according to claim 16, wherein the nut is formed with castellations and the bolt is provided with a lateral through hole such that, when the elastically deformable material has moved radially outwards such that the contact surface of the elastically deformable material engages with an inner surface of the first bore, a pin can be inserted between the castellations of the nut and through the through hole of the bolt to inhibit unwinding of the nut.

18. The aircraft landing gear assembly according to claim 1, wherein the body portion comprises a plurality of members, parallel to the insertion axis and arranged to elastically deform when the base portion is moved towards the head portion, wherein the contact surface is defined by one or more protrusions which each extend around the body portion.

* * * * *